(12) United States Patent
Rawlings et al.

(10) Patent No.: US 11,934,972 B2
(45) Date of Patent: *Mar. 19, 2024

(54) CONFIGURATION ASSESSMENT BASED ON INVENTORY

(71) Applicant: Microsoft Technology Licensing, LLC, Redmond, WA (US)

(72) Inventors: Todd R. Rawlings, Bellevue, WA (US); Rajvinder P. Mann, Woodinville, WA (US); Daniel P. Commons, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,169

(22) Filed: Mar. 29, 2023

(65) Prior Publication Data
US 2023/0237356 A1 Jul. 27, 2023

Related U.S. Application Data

(63) Continuation of application No. 16/983,821, filed on Aug. 3, 2020, now Pat. No. 11,640,547, which is a continuation of application No. 15/260,089, filed on Sep. 8, 2016, now Pat. No. 10,748,074.

(51) Int. Cl.
*G06N 7/01* (2023.01)
*G06F 11/00* (2006.01)
*G06F 11/07* (2006.01)
*G06F 11/30* (2006.01)
*G06F 11/34* (2006.01)
*G06N 7/00* (2023.01)
*G06N 20/00* (2019.01)
*G06N 20/10* (2019.01)

(52) U.S. Cl.
CPC ........... *G06N 7/01* (2023.01); *G06F 11/3006* (2013.01); *G06F 11/3051* (2013.01); *G06F 11/3433* (2013.01); *G06F 11/3452* (2013.01); *G06F 11/00* (2013.01); *G06F 11/0727* (2013.01); *G06N 7/00* (2013.01); *G06N 20/00* (2019.01); *G06N 20/10* (2019.01)

(58) Field of Classification Search
CPC ............. G06F 11/3006; G06F 11/3051; G06F 11/3433; G06F 11/3452; G06F 11/00; G06F 11/0727; G06N 7/00; G06N 20/00; G06N 20/10; G06N 7/01
USPC ..................................................... 706/21, 46
See application file for complete search history.

(56) References Cited

U.S. PATENT DOCUMENTS

2008/0097945 A1* 4/2008 Greis .................. G06F 11/3013
706/23

* cited by examiner

*Primary Examiner* — Shane D Woolwine
(74) *Attorney, Agent, or Firm* — Mannava & Kang, P.C.

(57) ABSTRACT

Systems and methods are described for facilitating operation of a plurality of computing devices. Data indicative of enumerated resources of a computing device is collected. The data is collected without dependency on write permissions to a file system of the one computing device. A condition of the computing device is determined based on historical data associated with enumerated resources of other computing devices. The identified condition can be updated as updated historical data becomes available. A communication to the computing device may be sent based on the identified condition.

20 Claims, 7 Drawing Sheets

CONFIGURATION ASSESSMENT BASED ON INVENTORY

PRIORITY CLAIM

This application is a Continuation of commonly assigned and co-pending U.S. patent application Ser. No. 16/983,821, filed Aug. 3, 2020, which is a Continuation of U.S. patent application Ser. No. 15/260,089, filed Sep. 8, 2016, entitled "CONFIGURATION ASSESSMENT BASED ON INVENTORY", now U.S. Pat. No. 10,748,074, issued Aug. 18, 2020, the entire contents of which are hereby incorporated by reference in their entireties.

BACKGROUND

As the variety and number of interconnected devices increase, tracking the configurations of the devices is becoming increasingly difficult. Providers of services to devices and their installed software must try to track and maintain information in order to provide support services. For example, licenses associated with various software applications may include multiple levels of use rights, access levels, time periods associated with a given license, and the like. In some scenarios, networked computing systems include various device components that may be provided from third party vendors. In this scenario, the magnitude of a given networked computing systems may increase the cost associated with enumerating the inventory for each component installed on every networked computing device in the system.

SUMMARY

Disclosed herein are methods and systems tier facilitating operation of a plurality of computing devices, Embodiments may include receiving data indicative of enumerated resources of a computing device. The data may be collected without dependency on write permissions to a file system of the computing device. Historical data associated with attributes of enumerated resources of other computing devices may be accessed. The historical data may be selected based on attributes of the other computing devices. The predicted probability of an event may be calculated based on the historical data. The predicted probability may be updated as updated historical data becomes available. A communication to the computing device may be sent when it is determined that the event is likely to occur.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed. Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
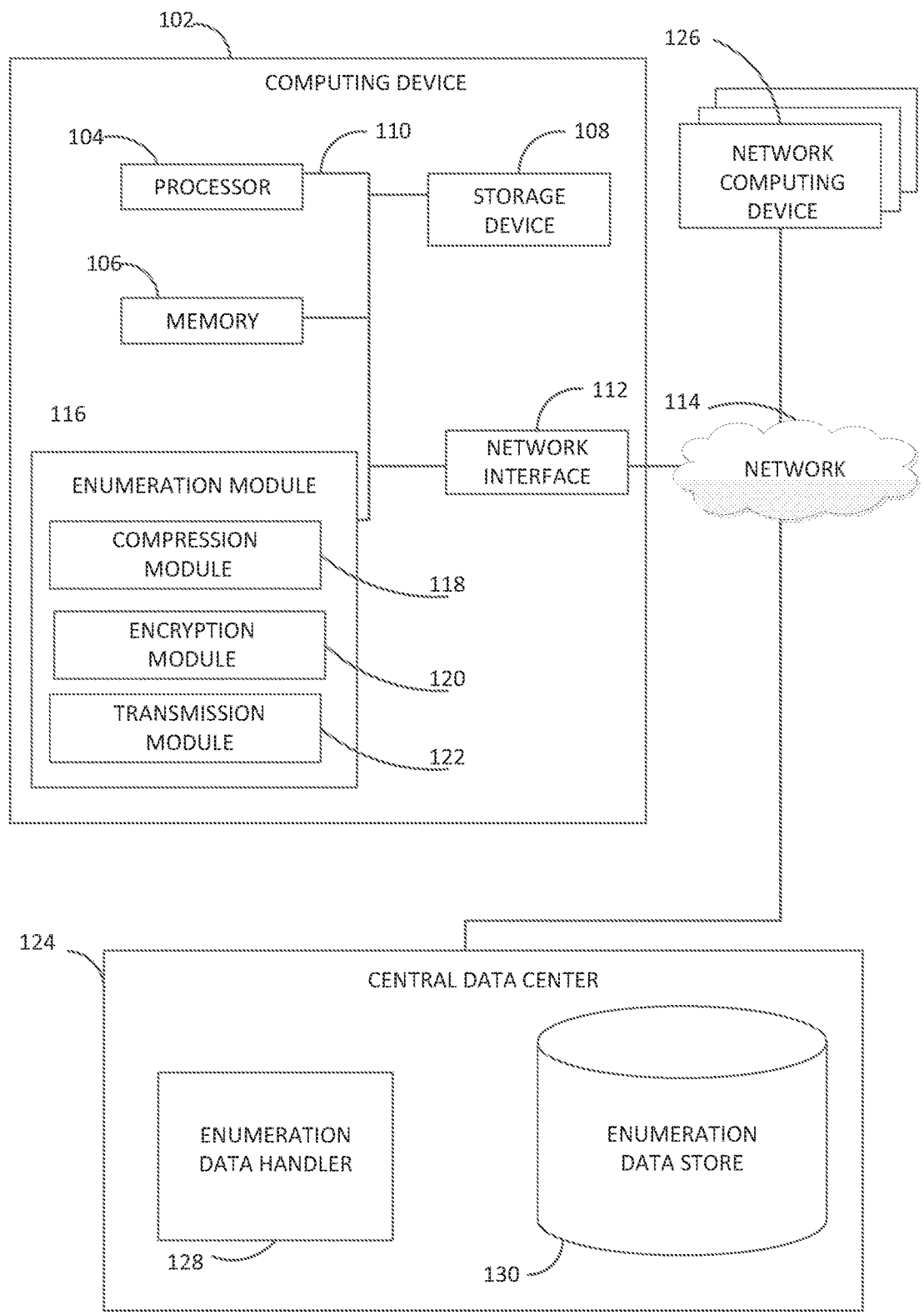
FIG. 1 is a diagram illustrating a mechanism for facilitating operation of a plurality of computing devices in accordance with the present disclosure.

The following detailed description is directed to technologies for the assessment of a device configuration based on inventory of the device. In the examples described herein, providing computing support services is one example scenario in which the described embodiments can be implemented. However, the described concepts can apply generally to other computing environments and services, for example in a data center or across multiple data centers.

Various embodiments are described for collecting and analyzing information via device resource enumeration. The described methods can include enumerating, via an enumeration module, resources of a networked device without dependency on write permissions to a file system of a networked device. The described methods may also include generating a data object stored in a memory unit of the networked device based on the enumerated resources, wherein the generated object includes a plurality of delimited sections represented in a single file.

The resource enumeration methods may be used to capture and pass along a detailed snapshot of the health and inventory of any computing device to a central repository. When this capability is combined with analytical methods such as machine learning, a service provider can be enabled with various ways to identify and compile root causes for issue support. For example, support staff may be presented with potential solutions to issues cross-referenced against similar configuration snapshots and historical issues. As inventory data and machine learning logic is accumulated, the service provider may be enabled to anticipate conflicts and system errors and automatically notify users with situational details. As another example, the service provider may automatically suggest upgrades to users and, with appropriate permissions, automatically upgrade computing devices with updates.

By providing such a system with detailed inventory data, the operational expenses of a service provider for providing support services may be greatly reduced. Furthermore, by providing a way to collect and analyze device information regardless of specific hardware and software platforms, services can be provided for any type and combination of devices and networks, including Internet of Things (IOT) devices.

Additionally, by providing such a system with configuration inventory data, the levels of analysis and services that may be provided by the service provider may be enhanced. For example, the number of possible causes of undesirable user experiences such as a slow internet connection may be numerous and dependent on a large number of factors that may exceed the ability for a human analyst to analyze and assess in a reasonable time. By providing such a system with detailed inventory data, analysis and assessment of information based on large amounts of information may be automated, allowing for greater levels of evidence-based analysis and services.

In some embodiments, an inventory management mechanism may be implemented to enable collection of device information, such as that described by U.S. patent application Ser. No. 14/671,591 "Networked Device Resource Enumeration" filed Mar. 27, 2015, the contents of which are incorporated herein in its entirety. Such a mechanism may be configured to gather information pertaining to the current state of a networked device (e.g., PC, server, laptop, and any kind of networked device including IoT that has some compute capability). The mechanism may be configured to track changes on a device to maintain detailed device state knowledge. Furthermore, the detailed device state knowledge may be supplemented with information from the service provider, information from industry sources, and crowdsourced information. In some embodiments, information about software and hardware conflicts may provide the service provider with the ability to be better informed and more prepared to answer customer questions, and also to proactively provide support and services to users. As discussed herein, such a system may be referred to as a configuration-based assessment system.

In one example, the configuration-based assessment system may analyze software and hardware changes for a device and assess their impacts, thereby having the capability to predict a problem or issue before the problem or issue manifests in a way that impacts the user. Once a problem or issue is anticipated, the configuration-based assessment system may be configured to simulate and test hundreds/thousands/millions of adjustments and code combinations to identify a fix to the problem or issue. In some embodiments, the configuration-based assessment system may automatically push fixes or automate roll back of code updates.

In some embodiments, the configuration-based assessment system may be implemented as an alternative or enhancement to human-based help desks that can allow for management of millions of variables and device states that may be difficult or impossible without such a system. Device and system providers may release new code and hardware through the configuration-based assessment system to pre-validate the code and hardware before shipping. Testing and validation may thus be performed in a continuous manner, utilizing networks such as the Internet, and provided on an automated basis while reducing device issues and vulnerabilities.

A platform or software provider may have an installed base of many thousands of devices including mobile device and other devices such as servers and storage devices. Numerous computing and network settings can be adjusted. For example, hardware settings and network settings may be configured differently across the user base. Because of the sheer number and variety of device configurations, it can be difficult to test and verify all of the possible settings, let alone characterize the changed settings with respect to specific performance metrics. When a device encounters a service issue, troubleshooting the issue can be a complex process due to the amount of data that must be evaluated. For example, metrics that may be evaluated include throughput, latency, and data loss. Even when the cause of a problem is found, the loss of use of the device may result in lost data, down time, and customer dissatisfaction.

It would be useful to predict failure of a device before a failure actually occurs, allowing the service provider to take preemptive measures, such as altering the configuration of the device, and thus avoiding problems associated with an unexpected loss of a device. In some embodiments, the configuration-based assessment system may implement methods and systems for predicting future device failures. For example, Bayesian methods may be employed to calculate the probability of a failure given a prior probability and update the prior probability with data to yield a posterior probability. The configuration-based assessment system may use existing data about deployed devices to calculate the prior probability of failure based on calculating the percentage of devices that have already experienced a failure. The data may be drawn based on various configurations, such as physical location, hardware, and installed software. The posterior probability may be calculated for a single device as well as for multiple devices using a distribution function, which can be derived using device configuration data. Probabilities may be updated over time as new data becomes available. For example, if a forecasted failure does not occur, then that data may be fed back into a model via a new value for the prior probability, and a new posterior probability may be calculated. Similarly, if a forecasted failure does occur, this data may also be fed back into the model and a new posterior probability may be calculated. In this way, a model capable of accurately predicting device failures can be implemented in the configuration-based assessment system.

Some of the techniques described herein include a lightweight executable module local to each computing device in a given networked computing system. The term, "lightweight" as referred to herein at least includes a module that does not depend on file system access to a computing device at which it is configured to gather inventory data. For example, the lightweight executable module may not have write access to the file system of a monitored computing device, and may only write to temporary non-persistent memory. Further, the term lightweight may also include a feature of an executable module that is configured to throttle operation in order to reduce operation performance degradation of components of the computing device such as software applications, hardware components, and the like. The term lightweight may also refer to a feature of the executable module wherein an output data object is human-readable text after machine readable decompression and decryption is performed. In other words, the lightweight executable module may be configured to generate relatively simple string data objects compared to heavier rich data objects other than string data objects.

The lightweight executable module may be referred to herein as an enumeration module. The enumeration module may generate a data object in-memory. The data object may be compressed and encrypted for durable transport across networks including non-secure network paths. For example, the compressed and encrypted data object may be durable such that transport across non-secure network paths may be used when other paths are not available with a reduced risk of exposing private or confidential enumeration detail. In other words, the techniques described herein increase a reliability of receiving the compressed and encrypted data object at a central analysis service or device. The lightweight executable may be useful in any networked device configuration. For example, the lightweight executable may be configured to perform operations in an Internet of Things (IoT) environment wherein networked devices may have relatively limited resources for device enumeration including status reporting and the like.

As used herein, the phrase "configured to" may encompass any way that any kind of structural component can be constructed to perform an identified operation. The structural component can be configured to perform an operation using software, hardware, firmware and the like, or any combinations thereof. The term "logic" may encompass any functionality for performing a task. For instance, each operation illustrated in the flowcharts corresponds to logic for performing that operation. An operation can be performed using software, hardware, firmware, physical electronic circuits, and the like, or any combinations thereof. The terms "component," "system," "client" and the like are intended to refer to a computer-related entity either hardware, software (e.g., in execution), and/or firmware, or a combination thereof. For example, a component can be a process running on a processor, an Object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like, FIG. 1 is a block diagram of an example of a computing system configured to provide enumeration data of a networked device environment. The computing system 100 may include a computing device 102. The computing device 102 may be, for example, a mobile phone, laptop computer, desktop computer, or tablet computer, among others. The computing device 102 may include a processor 104 that is adapted to execute stored instructions, as well as a memory unit 106 that stores instructions that are executable by the processor 102. The memory unit 106 may be non-persistent memory in relation to a storage device 108 that may include a hard disk drive for example. The processor 104 can be a single core processor, a multi-core processor, a computing cluster, or any number of other configurations. The memory unit 106 can include random access memory (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.)), flash memory, or any other suitable memory systems. The instructions that are executed by the processor 104 may be used to device resource enumeration.

The processor 104 may be connected through a system bus 110 (e.g., PCI, ISA, PCI-Express, NuBus, etc.) to network interface 116 may also be adapted to connect the computing system 100 through the system bus 106 to a network 114.

The storage 108 can include a hard drive, an optical drive, a USB flash drive, an array of drives, or any combinations thereof. An enumeration module 116 may be, in some cases, executable instructions to be stored in the storage device 108. In some cases, the enumeration module 116 may be implemented as logic, at least partially comprising hardware logic. The enumeration module 116 may include submodules including a compression module 118, an encryption module 120, and a transmission module 122. Although FIG. 1 illustrates each of the modules 118, 120, and 122 as being submodules of the enumeration module 116, each of the modules 116, 118, 120, and 122 may be implemented as discrete components, or as components of a broader process, or logical hardware construct.

The enumeration module 116 is configured to enumerate resources of the networked device without dependency on write permissions to a file system of the networked device, and generate a data object stored in a memory unit of the networked device based on the enumerated resources, in other words, the enumeration module 116 may be configured to generate the data object without write access to a file system of the computing device 102. In some cases, the enumeration module 116 may be implemented without write access, and may be configured to provide only one-way communication over the network 114 to a central data center 116 wherein the compressed and encrypted data object may be decrypted, decompressed, and analyzed as discussed in more detail below. Being configured to have only one-way access to the central data center 124 may reduce any back-door security threat potential that may otherwise enable malicious or even unintended access to the enumeration module 116. Further, in some cases, enumeration provided by the enumeration module 116 may be throttled. For example, depending on a given application being run on the computing device 102, the enumeration module 116 may delay enumeration of resources over a period of time such that performance of any other operation or application may not be influenced. In other words, the enumeration module 116 may be configured to be undetectable in regards to performance degradation that may be caused by an increased load related to enumeration operations.

In any case, the enumeration module 116 may be configured to generate a data object stored in a memory unit, such as the memory unit 106, of the computing device 102 based on the enumerated resources. The enumerated resources may include any number of resource variations. For example, the enumeration module 116 may be configured to identify, inventory, gather, or otherwise determine installed software packages, hardware components, licenses associated with installed software, updates to hardware components, and the like.

The data object stored in the memory unit 106 may include a delimited list. The data object may include multiple delimited sections embedded into a single file, multiple sections of enumerated data may be extracted out as separate delimited files, but may require more data redundancy to use any of these delimited files on their own. Accordingly, a first section of the delimited sections may be a root section, while other sections relate to the root, such as in a star schema in data architectures. The multiple delimited lists may each related to different classes of enumeration information. For example, each delimited list may relate to performance, network operations, users associated with the computing device 102, administrators associated with e computing device 102, installed software, hard disk drives of the computing device 102, processors installed in the computing device 102, memory installed in the computing device 102, and the like. Further, in some cases the computing device 102 may be implemented as a virtual machine wherein each of the delimited lists may be related to classes of enumeration information associated with the virtual machine.

The enumeration module 116 may be deployed upon operation of one or more external operations provided via the central data center 124. For example, the central data center 124 may run a structured language query (SQL) to interrogate the computing device 102. Upon deployment of the SQL, the enumeration module 116 may be initiated. In some cases, the enumeration module 116 may be embedded into an operating system (OS) of the computing device 102. In this scenario, an OS may initiate operations of the enumeration module 116. In any case, the enumeration module 116 may be configured to deploy after predetermined configurable time periods. For example, in some cases the enumeration module 116 may be configured to deploy once a day.

Once the enumeration module 116 has generated the data object related to the enumeration data, the compression module 118 may be configured to compress the data object. The compressed data object may then be encrypted via the encryption module 120. As discussed in more detail below in regard to FIG. 2, the encryption module 120 may include a two part process of synchronous encryption such as Advanced Encryption Standard (AES), as well as asynchronous encryption such as RSA (publically described in 197 by Rivset, Shamir, and Adlemen). Other encryption methods of both synchronous and asynchronous encryption are contemplated.

The computing system 100 may include other networked devices, such as one or more networked computing devices 126. The networked computing devices 126 may be implemented similar to the computing device 102 and may include an enumeration module, such as the enumeration module 116 local to each device. Enumeration data in compressed and encrypted format may be provided to the central data center 124 for analysis by an enumeration data handler 126. The enumeration data handler 128 may be implemented as logic, at least partially including hardware logic, software, firmware, or any combination thereof. The enumeration data handler 128 may be configured to decrypt and decompress the enumeration data, as well as decompose the combined delimited file into dimensions of data associated with each of the multiple delimited files in the combined delimited file. Data may be stored in a central data store, such as the enumeration data store 120 of the central data center 124. As discussed in more detail below, the enumeration data provided to the central data center 124 may be used to update current or previously known inventory data based on a change in enumeration data objects received.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the calibration module 120, detection module 122, environment module 124, and projection module 126 may be partially, or entirely, implemented in hardware and/or in the processor 102. For example, the functionality may be implemented with an application specific integrated circuit, in logic implemented in the processor 102, or in any other device.

Figure 2:
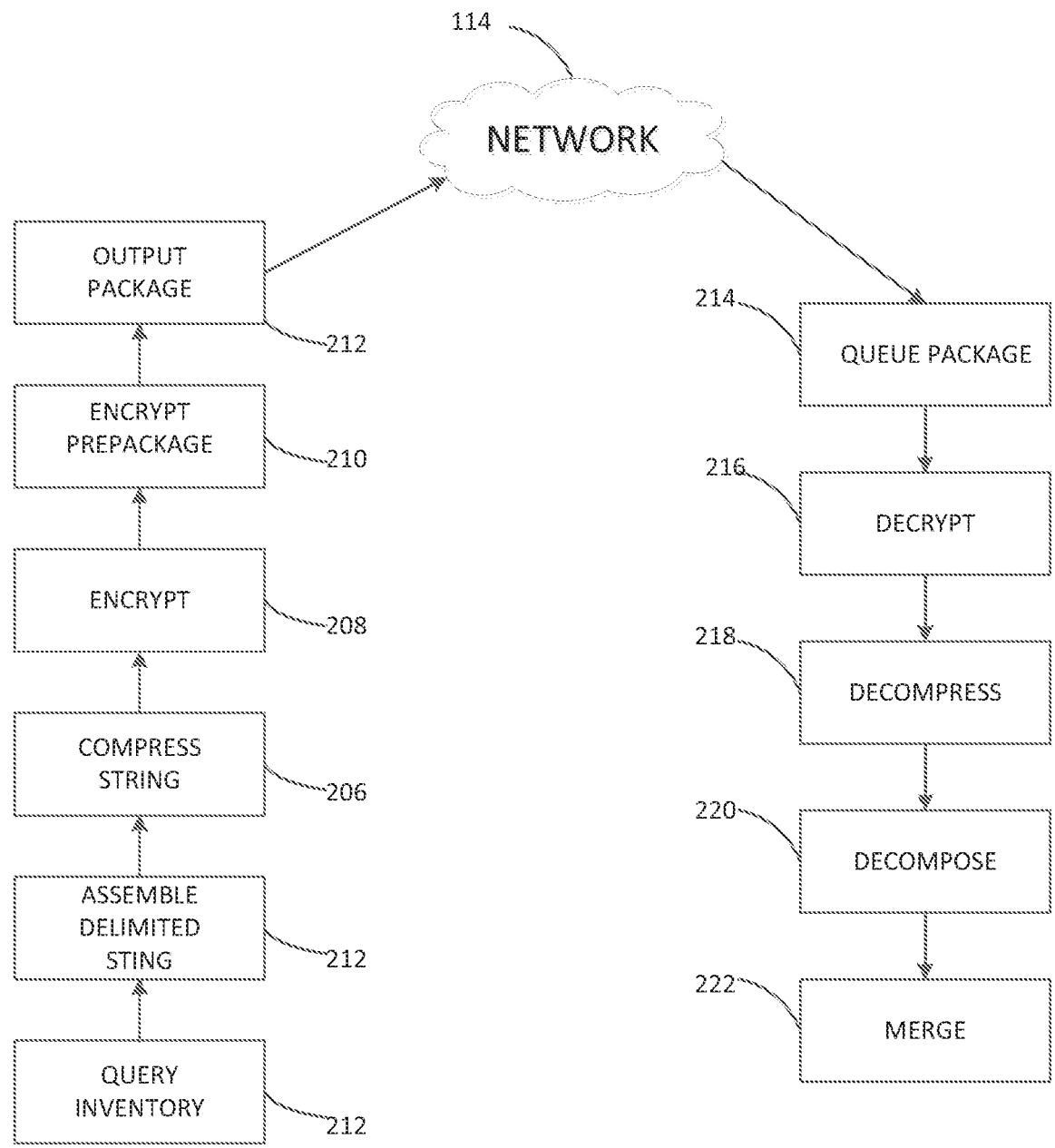
FIG. 2 illustrates an example process for enumerating resources.

FIG. 2 is a process flow diagram of an example process for enumerating resources of a networked device. At block 202, inventory data may be queried locally at a networked computing device, such as the computing device 102 of FIG. 1. Querying inventory data may include enumeration of resources of the networked device without dependency on write permissions to a file system of the computing device 102. As discussed above, enumeration may be throttled based on available resource bandwidth of the computing device 102 such that enumeration may be undetectable in terms of reduced performance of other active processes and operations of hardware, software, and the like.

At block 204, a delimited string may be assembled. Assembly of the delimited string may include generating a data object stored in a memory unit, such as the memory unit 106 of the computing device 102 based on the enumerated resources queried at block 202. At block 206 the data object may be compressed, and at block 208 the compressed data object may be encrypted.

Encrypting at block 208 may be a synchronous encryption, such as AES encryption discussed above in regard to FIG. 1. The synchronous encryption 208 my use a dynamically generated key an initialization vector as well as a computed hash value of encrypted bytes. At block 210, asynchronous encryption may be performed on the computed hash value, the dynamically generated key, and initialization vector. The encryption 210 may be packaged as a prepackage using an embedded public key of a destination device, such as a device associated with the central data center 124 of FIG. 1. In some cases, if a temporary directory exists, a plain text, human-readable, file with the enumeration data may be created at the computing device 102.

The prepackage and a payload including computed hash value of encrypted bytes from the synchronous encryption 208 may be combined into an output file at block 212. The output file may be provided to a network, such as the network 114. In some cases, the network 114 may comprise one or more of the closest networked devices such as the networked computing devices 126. The enumeration module 114 of FIG. 1 may comprise a list of addresses for inboxes to potentially use as destination inboxes.

At block 214, the package as well as the prepackage may be queued. The queue at 214 may be configured to pull enumeration data objects from inboxes and queue them for decomposition. Beforehand, decryption including decryption of the prepackage and decryption of the payload package may be performed at 216. Further, the enumeration data object may be decompressed at 218. At 220, the assembled delimited string from block 204 may be decomposed. In other words, the combination of delimited files may be separated and decomposed to serialized text to be stored in relational database structure during a merae occurring at 222. Merging may include joining the enumeration data via SQL to an appropriate database.

In some cases, the decomposition at 220 may include decomposing into in-memory data tables in batches to increase throughput. Once a given number of packages are decomposed into the collection of data tables they may be passed to SQL during the merge 222. Each in-memory data table may be directly passed to SQL without any input/output overhead. For example, a data table dictionary may be assembled. The oldest package may be retrieved from the queue. The package may be exclusively locked, and the first 128 bytes of payload, RSA decrypt may be split off from the computed hash value associated with the synchronous encryption, as well as the key and vector. A second synchronous hash (SHA) may be computed to compare against the decrypted RSA hash. If hashes don't match, the package may be marked as suspect.

The payload may be decrypted using the initialization vector and key. Once the data has been decompressed the delimited and demarked enumeration object data may be parsed. For example, a data table may be targeted wherein a demarked value relates to a key in the dictionary. Decompression may be done in stages based on a batch size. Each data table having a dictionary with more than 0 rows may be sent to SQL, and, once committed to SQL the enumeration data object may be deleted. Further, the merge 222 may include runtime metrics configured to track performance, scalability, rate of change.

Figure 3:
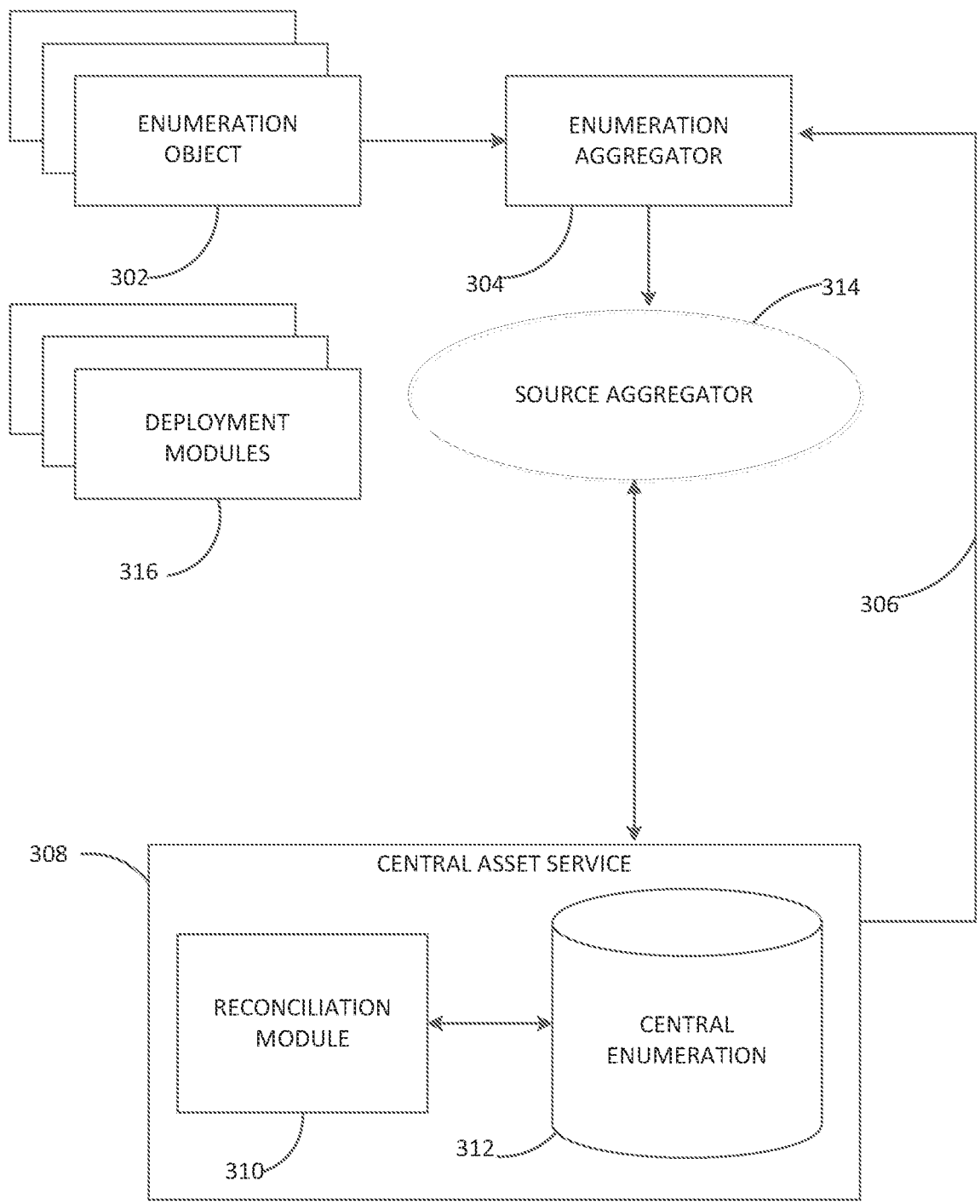
FIG. 3 is a block diagram illustrating a process of reconciling enumeration data with a central asset service.

FIG. 3 is block diagram illustrating a process of reconciling enumeration data with a central asset service. The techniques described herein may provide a higher level of granularity in terms of resource enumeration than may otherwise be available at a centrally run enumeration process. In some cases, enumeration data received may be compared with enumeration data previously stored enumeration data, and updates may be provided based on any change of enumeration data. In FIG. 3, enumeration objects may be generated at 302.

The enumeration objects 302 may be enumeration data objects generated as discussed above in regard to FIG. 1 and FIG. 2 from one or more computing devices, such as the computing device 102, the networked computing devices 126, and the like. The enumerated objects at 302 may be passed to an enumeration aggregator 304. The enumeration aggregator 304 may be a data store, such as the enumeration data store 130 of FIG. 1, or may be a separate data store configured to temporarily store enumeration data. As indicated at 306, a central asset service 308 may be pointed to the enumeration aggregator 304. The central asset service 308 may be a central inventory system configured to receive enumeration data and reconcile enumeration data as the enumeration data changes via a reconciliation module 310. Differences, or changes in enumeration data may be provided to a central enumeration data store 312. The central enumeration data store 312. Additional tools, such as a source aggregator 314 may be used to receive updates from one or more deployment modules 316. Operations of the source aggregator 314 may provide updates based on reconciliation performed at the reconciliation module 310 and stored in the central enumeration data store 312 to various one or more deployment modules 316.

Figure 4:
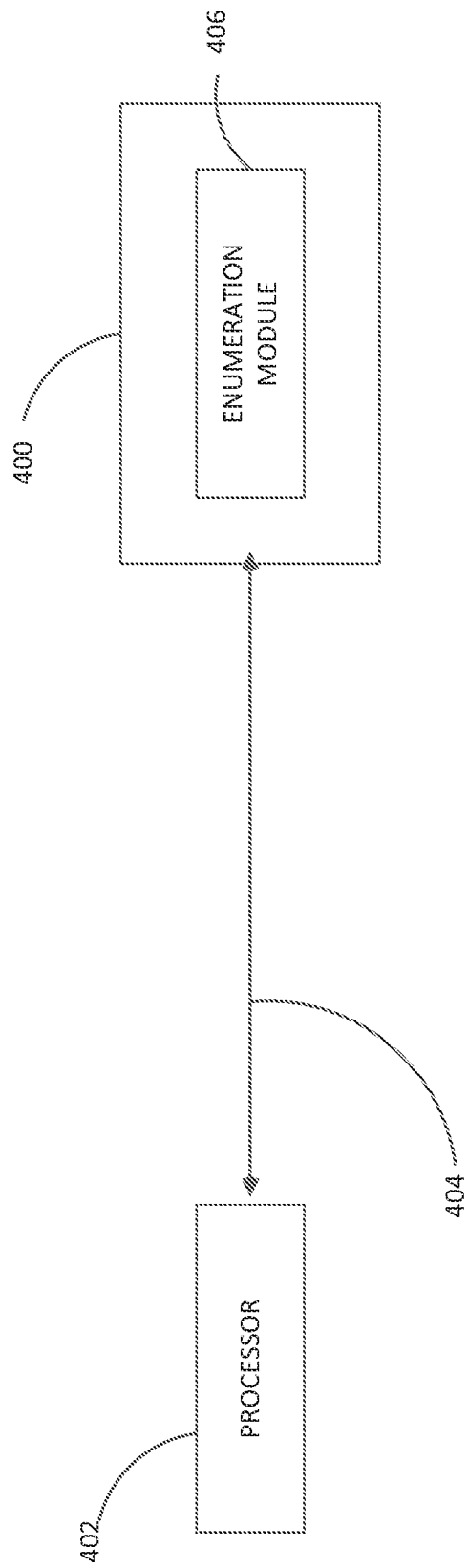
FIG. 4 is a block diagram illustrating a method of generating a data object associated with enumeration data.

FIG. 4 is a block diagram illustrating a method of generating a data object associated with enumeration data. At block 402, resources of a networked device may be enumerated. Enumeration may be performed without dependency on write permissions to a file system of the networked device. At block 404, data object is generated to be stored in a memory unit of the networked device based on the enumerated resources. The data object may be stored in non-persistent memory to avoid write permissions associated with the file system of the networked device. The generated object at 404 includes a multiple delimited sections represented in a single file.

In some embodiments, the data object may be compressed at 406. At block 408, the compressed data object may be encrypted. At 412, the encrypted and compressed data objected may be transmitted to destination device. The method 400 may be configured such that only one-way communication to the destination device may be enabled. This may reduce security risk that may otherwise occur if two-way communication was enabled. In other words, the method 400 may be implemented via a one-way only executable lightweight module, as discussed above, which is local to the networked device.

FIG. 4 is a block diagram of an example computer-readable storage media for enumerating resources. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include an enumeration application 406 for enumeration of resources of a networked device. For example, the calibration application 406 can enumerate resources of a networked device without dependency on write permissions to a file system of the networked device. The calibration application 406 can also generate a data object stored in a memory unit of the networked device based on the enumerated resources, wherein the generated object includes a plurality, of delimited sections represented in a single file. The calibration application 406 can also generate a data object stored in a memory unit of the networked device based on the enumerated resources, wherein the generated object includes multiple delimited sections represented in a single file. The data may be compressed and encrypted. The encrypted and compressed data object may be transmitted to a destination device wherein no two way communication is enabled for communication of the destination device back to the enumeration application 406.

In an embodiment, the following data may be gathered from user devices by the configuration-based assessment system:

Core device data—AssetTag, SerialNumber, FirstMac, DeviceName, DeviceDoniain, Model, Manufacturer Network
  NetworkAdapter DeviceID, MACAddress, Manufacturer, NetConnectionID, NetConnectionStatus, ProductName, ServiceName, Speed, TimeOfLastReset NetworkAdapterConfiguration DefaultIPGateway, DHCPEnabled, DHCPServer, DNSDomain, DNSDomainSuffixSearchOrder, DNSServerSearchOrder, Index, InterfaceIndex, IPAddress, IPSubnet
  ArpData—InterfaceIP, InterfaceIndex, IPAddress, MACAdress, type
  RouteData—NetworkDestination, Netmask, Gateway, Interface, Metric Component
  BIOS Manufacturer, ReleaseDate, SMBIOSBIOSVersion, Version
  PhysicalMemory—Capacity, DataWidth, DeviceLocator, Manufacturer, Model, Name Processor—AddressWidth, Architecture, CurrentClockSpeed, CurrentVoltage, DeviceID, Manufacturer, MaxClockSpeed, Name, NumberOfCores, Processorid, SocketDesignation DiskDrive—Name, Description, DeviceID, FirmwareRevision, Index, InterfaceType, Manufacturer, Model, Partitions, PNPDeviceID, SerialNumber, Signature, Size DiskPartition—Bootable, BootPartition, Diskindex, Index, PrimaryPartition, Size, StartingOffset, Type LogicalDisk DiskIndex, PartitionIndex, DeviceID, DriveType, FileSystem, FreeSpace, Size, VolumeName OS/Metadata Operating system data Name, CountryCode, CSDVersion, CurrentTimeZone, InstallDate, LastBootUpTime, Locale, OSArchitecture, OSLanguage, TotalVirtualMemorySize, Total VisibleMemorySize, Version UserProfiles—Name, CreationTimeUtc, LastAccessTimeUtc, LastWriteTimeUtc Share—Name, MaximumAllowed, Name, Path, Status, Type Administrators—AdministratorId, Domain, Account, isGroup SystemMetaData—DynamicSiteName, PendingRehoot, PendingFileRenameOperations, ComputerSid, FrameworkRelease VirtualMachineData—PhysicalHostNameFullyQualified, VirtualMachineId Software InstalledApplications—Is64Bit, DisplayName, DisplayVersion, InstallDate, UninstallString Services—DisplayName, Name, PatliName, ProcessId, StartMode, StartName, State Processes—CreationDate, ExecutablePath, Name, ParentProcessId, Priority, ProcessId, ThreadCount ProcessResources—ElapsedTime, IOReadBytesPersec, IOWriteBytesPersec, Name, PageFaultsPersec, PercentProcessorTime, PrivateBytes, VirtualBytes, WorkingSet ServerFeatures—FeatureId, Name, ParentId.

§ Performance/Load

PerfFormattedDataTcpIpNetworkInterface BytesReceivedPersec, BytesSentPersec, CurrentBandwidth, Name, PacketsReceivedPersec, PacketsSentPersec PerfLogicalDisk—AvgDiskQueueLength, DiskReadBytesPersec, DiskReadsPersec, DiskWriteBytesPersec, DiskWritesPersec, Name PerfMemory—AvailableMBytes, CacheBytes, ComittedBytes, PageFaultsPersec, PageReadsPersec, PageWritesPersc PerfProcessor—Name, PercentC1Time, PercentC2Time, PercentC3Time, PercentidleTime, PercentInterruptTime, PercentPrivilegedTime, PercentProcessorTime, PercentUserTime PerfSystem—ContextSwitchesPersec, FileReadBytesPersec, FileWriteBytesPersec, Processes, ProcessQeueLength, Threads The above described data are examples of information that may be collected from user devices by the configuration-based assessment system. Other high fidelity system health and component level data may be collected. By automatically collecting such data for analysis and storage, human-based effort to perform such analysis may be reduced through the availability of detailed actionable system health and component data. The collection of the data may be scaled to an unlimited number of devices across diverse environments.

Figure 5:
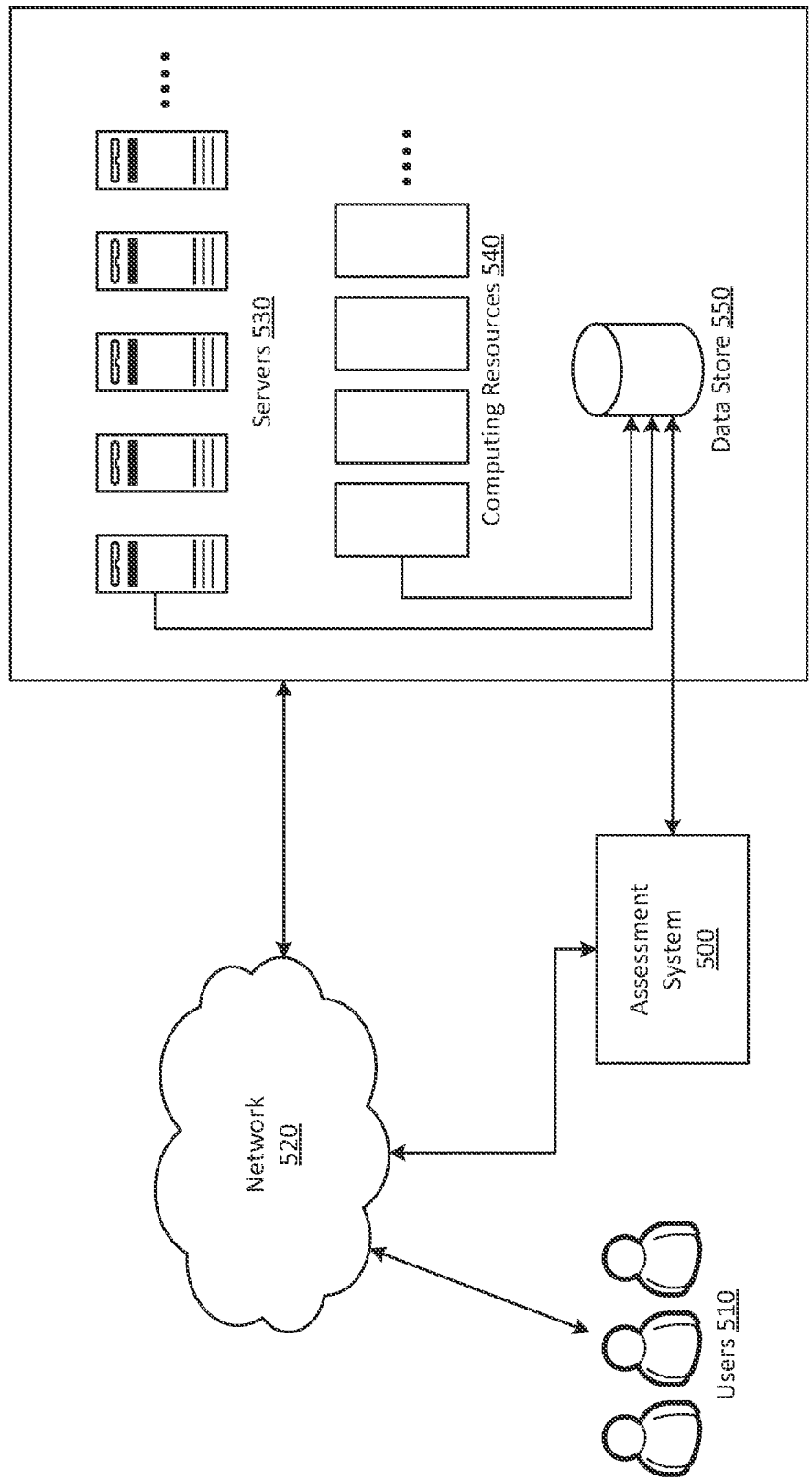
FIG. 5 is a diagram illustrating a mechanism for facilitating operation of a plurality of computing devices in accordance with the present disclosure.

FIG. 5 is a diagram illustrating a configuration-based assessment system 500 for identifying issues in accordance with the present disclosure. In FIG. 5, an off-device service may include resources and applications that may execute, for example, on one or more servers 530. It will be appreciated that some embodiments may involve additional computing resources 540 of various types that may be provided.

FIG. 5 also illustrates a network 520 that may provide communications for one or more devices accessible by users 510. According to one embodiment, resources executing on servers 530 may be configured to provide support services to users 510 via network. 520. FIG. 5 also illustrates a data store 550 that may store data pertaining to various events and metrics for devices of users 510.

A request may be sent to configuration-based assessment system 500 for monitoring and analyzing one or more user devices. The configuration-based assessment system 500 may be co-hosted with the servers 530 and data store 550, or may reside on devices of users 510, or a combination thereof. In some embodiments, a request may be received from a device of one of the users 510 for analytics services. In other embodiments, the request may be received from one or more services at the device manufacturer. In response to receipt of the request, configuration-based assessment system 500 may log the request and provide updates as to the status of the request. The configuration-based assessment system 500 may communicate with other services to facilitate: (1) processing of the request, (2) collection of data pertaining to request, and (3) generating interfaces to provide results of the request. The configuration-based assessment system 500 may, for example, provide an interface for facilitating submission of the request. The configuration-based assessment system 500 may further provide an interface for viewing the results of the request and modifying or cancelling the request.

Configuration-based assessment system 500 may be configured to provide analysis and diagnostics for providing predicted event probabilities based on real time or accumulated and/or archived monitoring of various devices. The configuration-based assessment system 500 may access metrics, such as device type and device usage activity. The configuration-based assessment system 500 may be made accessible via an application programming interface (API) or a user interface that may be accessed via a Web browser or other input mechanisms.

Within this operating environment, configuration-based assessment system 500 may determine a predicted probability of a failure or other event. Configuration-based assessment system 500 may gather data from other components of the operating environment, such as data store 550. Data store 550 may collect information from devices of users 510, among others. The configuration-based assessment system 500 may also collect information stored in log files and other locations that may be available from computing resources 540. The information may also be obtained by querying devices for data that is not currently being stored in a log file.

In some cases, configuration-based assessment system 500 may not have access to all available data for the relevant devices because doing so would take too much time, would require too much storage space to store, or some of the data may have been determined to have a low likelihood of being relevant to determining the event rate for the device of interest. In other cases, some of the data may be configured only to be accessible manually or may be unavailable because the data is on a network segment to which the configuration-based assessment system 500 does not have access. The configuration-based assessment system 500 may use the available information to determine an initial probability for an event and update the probability as more information becomes available.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Configuration-based assessment system 500 may be configured to provide analysis and diagnostics for providing predicted event probabilities based on real time or accumulated and/or archived monitoring of various devices. The monitored devices may include devices of various types, such as personal computers and tablets. The monitored resources may also include other computing resources monitored by the service provider, such as storage devices. The configuration-based assessment system 500 may access metrics, such as installed operating system, installed applications, and firmware settings. The configuration-based assessment system 500 may be made accessible via an application programming interface (API) or a user interface that may be accessed via a Web browser or other input mechanisms.

Trouble-shooting a device failure may be difficult for the following reasons:

(1) Performing the trouble-shooting may require a wide range of knowledge.

(2) Performing the trouble-shooting is typically based on partial information. Information is usually incomplete due to the desired information being unavailable to a tool that is used in trouble-shooting (e.g., the information is located outside of the system that performs the troubleshooting).

(3) Performing the trouble-shooting may require experience to know what missing information needs to be collected. Analyzing and considering every piece of information may be time-consuming and may also ultimately be unnecessary in the trouble-shooting process.

One way to address the above issues is to implement ways to predict future device failures. For example, Bayes' theorem may be used to calculate the probability of an event given two pieces of data: the belief that the event will occur (called the prior probability) and the likelihood that it will occur. The result of the calculation will yield what is called the posterior probability. In one embodiment, existing data about a current set of devices may be used to calculate the prior probability with a known degree of certainty. The calculation may be based on the percentage of devices that have already had the event occur. In one enibodiment, a sample set of devices (e.g., servers) may be defined by common attributes, such as physical location, hardware, software installed, and other factors. Once a sample is defined, the prior probability may be calculated based on known failure rates of the sample set of devices.

After calculation of the prior probability, or the initial likelihood of an event, the posterior probability can be calculated as additional data is gathered and made available. The posterior probability can be calculated for a single device or can be calculated for a group of devices using a distribution function. The distribution function can be derived, for example, using the device's attribute data along the x-axis.

By using Bayes' theorem to update the event probability, the posterior probability can be updated as new data becomes available. For example, if a forecasted event does not occur, this data may be fed back into the model and a new value for the prior probability and a new posterior probability may be calculated. Similarly, if a forecasted event does indeed occur, this information may be fed back into the model and a new posterior probability may be calculated.

In one enibodiment, the probabilities may be updated at specified time intervals, where real-time posterior probabilities may be calculated that include events during the previous interval. In this way, an accurate model for predicting device events may be implemented. The predications may be further updated by comparing the prediction model to the actual observed behavior.

In some embodiments, an expert system that utilizes logical inferences based on the available information may be used. An expert system may take available information pertaining to actual failures of devices and use the information as input to a rules-based system to generate updated event probabilities. The available information may be provided to a Bayesian process to determine an updated probability for the event.

After the probability has been calculated, information regarding the predicted event rate may be returned to the user who requested information about the event. The predicted event rate based on the most recent information may be provided. Additionally, updates to the predicted event rate may be provided if new information that affects the calculation is made available. In some embodiments, the source of the event if the event is, for example, a failure may also be provided. This may also comprise identifying a remedy to the potential source of the failure.

In some embodiments, the probability analysis may be performed based on machine learning via a machine learning system that includes one or more learning functions that learns the probabilities associated with the availability of various data that may be relevant to the determination of the event rate. This probability analysis may also be performed based on history data of prior probability analyses, or performed based on a user indication of a rule to be used in the probability calculation.

In some embodiments, the configuration-based assessment system 500 may monitor events and device attributes automatically. For example, the service provider may monitor a number of pre-selected events collected or determined at a predetermined frequency. Additional event data may be collected at the same or different frequencies as specified by the service provider. It should be understood that the event data may be collected for any of the computing resources provided by the service provider including servers, databases, storage, and the like.

Additionally, the configuration-based assessment system 500 may provide users with the ability to request and receive notifications or to take specified actions depending on the events. For example, the service provider may cause the download of a software patch to a device that is predicted to fail. In some embodiments, the event data may be retained for a predetermined time to allow users to retrieve historical metric data for review and analysis. A user interface may be provided to allow access to the configuration-based assessment system 500.

In some embodiments, a time frame for the event prediction may be specified as well as the resources to be evaluated. For example, a user may want to determine the predicted event rate for a device over a period of one month.

The configuration-based assessment system may provide a detailed analysis and summary of results to the requesting user. In some embodiments, the identification of one or more causes of a predicted event, such as a failure, may be accompanied by suggested solutions to the identified issues. If the source of an identified issue is at the service provider, then a summary of recommended actions to be taken by the service provider may be provided.

In some embodiments, an API may be provided to facilitate requests for predicted event information. For example, an API can be called with information such as a device identifier, event start time, and event end time. After the API is called, in one embodiment the configuration-based assessment system 500 may take actions such as:

Access activity records for the device.
Retrieve configuration data of related devices.
Call available APIs that can provide metrics for the devices.
Invoke a probability determination function to generate the predicted probability of an event.

Using the gathered information, the configuration-based assessment system 500 may analyze the data, combine or aggregate the data or extract portions of the data as appropriate, and invoke a function such as a probability determination function to generate the predicted probability of an event. The determined event probability may be reported through the API along with details regarding potential causes for the event prediction.

The stored data can be aggregated and analyzed to identify profiles, patterns, and various statistics. For example, through analysis of error rates, health and performance of a connected device can be determined. Data mining of collected device data can be useful to identify various characteristics for inferring the current state of a device or a group of devices.

In some embodiments, the collected data may be analyzed to determine statistical information. Furthermore, data mining may be performed to identify trends and patterns related to device function, health, and performance. In one embodiment, the configuration-based assessment system may be configured to analyze the data. The configuration-based assessment system may be implemented, for example, as a rate detection vector engine. The detection vector engine may incorporate a Naive Bayes classifier, fuzzy logic, and other methods. The detection vector engine may be configured to determine which data patterns are relevant for error analysis.

In some embodiments, the configuration-based assessment system may implement a pattern classification system to identify relevant data. For example, the detection vector engine may include a learning system that may include a learning function to continuously learn which data patterns are relevant to a particular potential problem. In some embodiments, supervised learning may be incorporated where administrators of a configuration-based assessment system may classify observations made from various devices and a number of error types. The off-device data storage and analysis service may assign metadata to the observations. The metadata may be updated by a learning system to update relevance to the profiles of interest as new observations are made and assigned tags to the new observations. The data storage and analysis service may learn which observations are alike and assign metadata to identify these observations. The learning system may classify future observations into categories.

In some embodiments, an algorithm, such as a feature subset selection algorithm or an induction algorithm, may be implemented to define groupings or categories. Probabilistic approaches may also be incorporated. One or more estimation methods may be incorporated, such as a parametric classification technique. In various embodiments, the data storage and analysis service may employ a combination of probabilistic and heuristic methods to guide and narrow the data that are analyzed.

In order to provide relevant results that are more likely to indicate causes for a particular observed pattern of data, the most relevant patterns may be identified and weighted. In some embodiments a heuristic model can be used to find satisfactory solutions that provide an acceptable confidence level in the results. For example, experience-based techniques, such as expert modeling can be used. Markov modeling or variations thereof can also be used in some embodiments.

In general, the configuration-based assessment system may provide information to various users. For example, the configuration-based assessment system may allow the data to be accessible via a web site, or may allow the data to be accessible to users via a cloud-based system. The configuration-based assessment system may also allow device support and operations services to access the data via the website or through a side channel. The device support and operations services can therefore access the error levels, warnings, and information status to provide appropriate and timely services to users. For example, design and quality assurance personnel can access the data to make improvements to the design and production processes.

The configuration-based assessment system may provide useful alerts and information to the user of a device via a user interface of the device. As an example, in one scenario, a healthy device indication may be provided to the user.

In another customer alert scenario, a device health alert may be provided to the user. The alert may notify the user of detected abnormal behaviors that may be impact the user experience.

A dynamic statistical model can be established using the configuration data from multiple devices. The data may include historic data where devices experienced service issues. The data may be clustered by various axes. A probability distribution function can be determined for each type of device. The types may include, for example, manufacturer, model, size, and age. A range in the probability distribution function that includes the majority of the healthy devices can then be determined. The model can identify devices that are outliers in the probability distribution function and initiate actions to notify the identified devices. The model can, for example, identify parameters such as the distance that outliers need to be from a given probability distribution function before a notification action is considered.

The configuration-based assessment system may improve the user experience by providing more accurate diagnostic results and calculation of trackable trends for devices that may not be performed on a single device. Trends can include, for example, expected life span, performance, and device stability.

Figure 6:
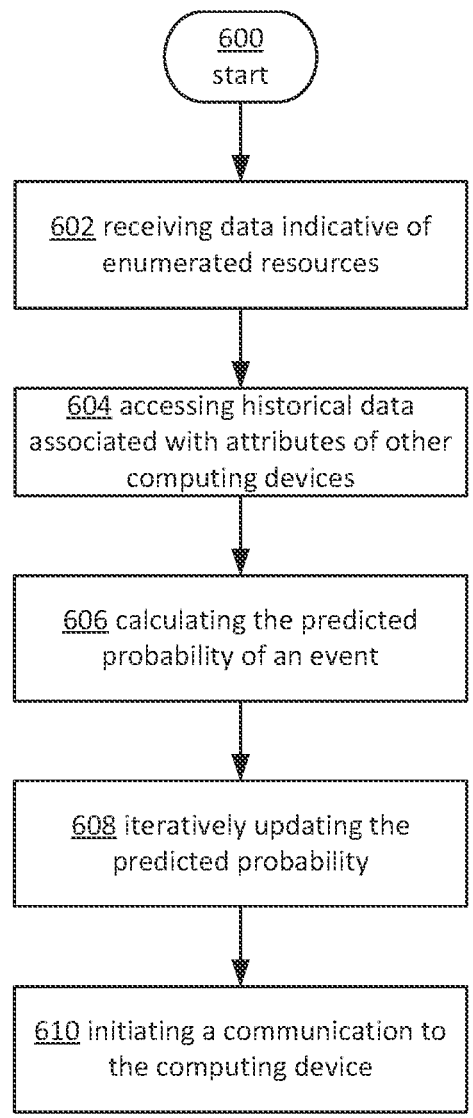
FIG. 6 is a flowchart depicting an example procedure for facilitating operation of a plurality of computing devices in accordance with the present disclosure.

FIG. 6 illustrates an example operational procedure for facilitating operation of a plurality of computing devices. In an embodiment, the procedure can be implemented at least in part in a system or function corresponding to configuration-based assessment system 500 in FIG. 5.

Referring to FIG. 6, operation 600 begins the operational procedure. Operation 600 may be followed by operation 602. Operation 602 illustrates receiving, from one of the computing devices, data indicative of enumerated resources of the computing device. In one embodiment, the data may be collected without dependency on write permissions to a file system of the computing device. Operation 602 may be followed by operation 604. Operation 604 illustrates accessing historical data associated with attributes of enumerated resources of other computing devices. The historical data may be selected based on attributes of the other computing devices.

Operation 604 may be followed by operation 606. Operation 606 illustrates calculating the predicted probability of an event based on the historical data. Operation 606 may be followed by operation 608. Operation 608 illustrates iteratively updating the predicted probability of the event as updated historical data becomes available. Operation 608 may be followed by operation 610. Operation 610 illustrates initiating a communication to the one computing device when it is determined that the event is likely to occur. The determination may be based on the predicted probability.

Figure 7:
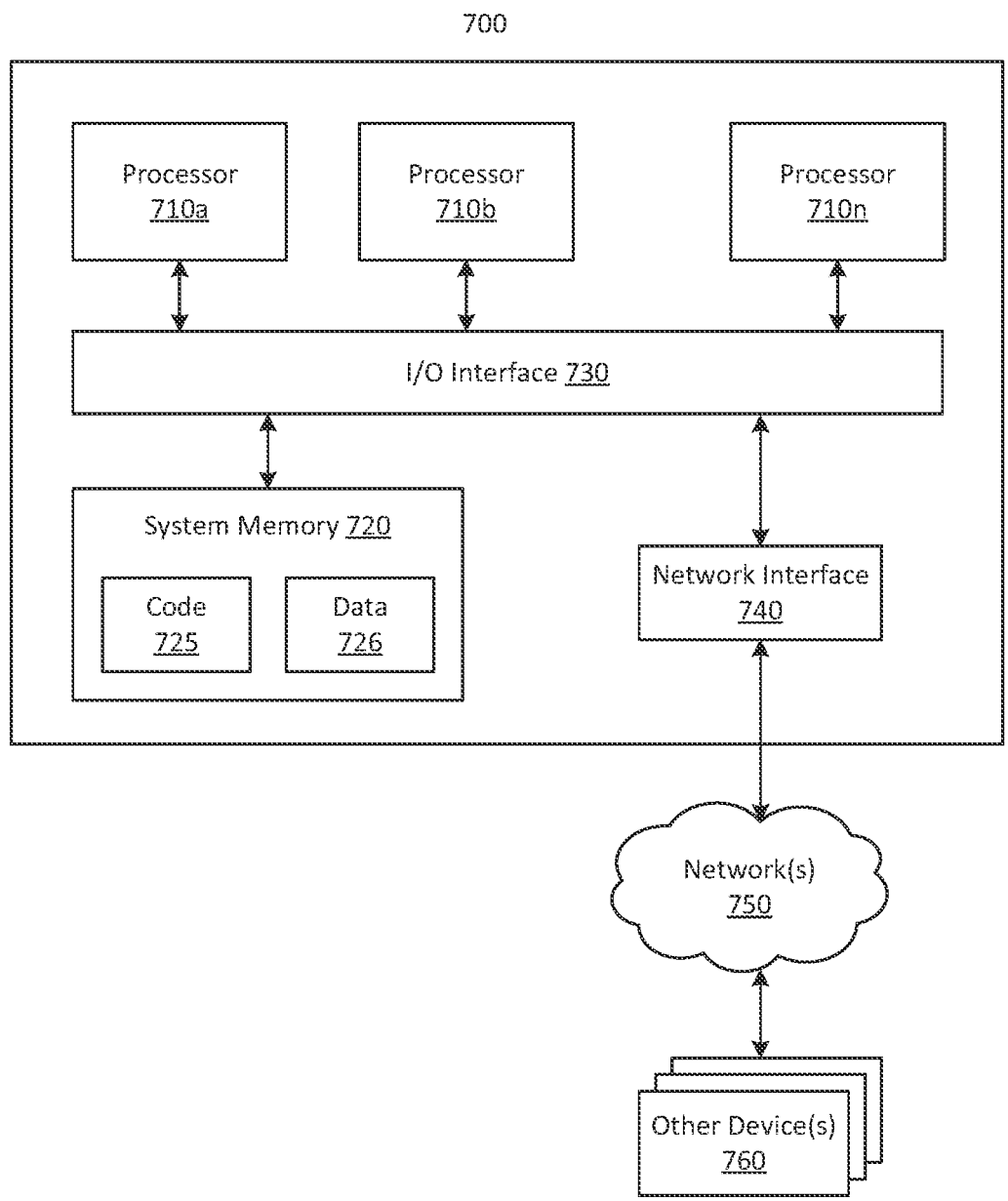
FIG. 7 is an example computer system that may be used in some embodiments.

In at least some embodiments, a computing device that implements a portion or all of one or more of the technologies described herein, including the techniques to implement the functionality of an configuration-based assessment system 700 may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In sone embodiments, I/O interface 730 may include support for devices attached through various types of peripheral buses, such as a variant of the Peripheral Component interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interthce to system memory 720, may be incorporated directly into processor 710.

Network interface 740 may be configured to allow data to be exchanged between computing device 700 and other device or devices 760 attached to a network or network(s) 750, such as other computer systems or devices as illustrated in FIGS. 1 through 11, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

A network set up by an entity, such as a company or manufacturer, to provide one or more services (such as various types of cloud-based analytics services) accessible via the Internet and/or other networks to a distributed set of clients may be termed a service provider. Such a provider network may include numerous data centers hosting various resource pools, such as collections of physical and/or virtuahzed computer servers, storage devices, networking equipment, and the like, needed to implement and distribute the infrastructure and services offered by the service provider.

A number of different types of computing devices may be used singly or in combination to implement the resources of the service provider in different embodiments, including general-purpose or special-purpose computer systems, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, CH and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules andior systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g, as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wiredi-cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method comprising:
receiving, from a first computing device, data indicative of resources of the first computing device;
identifying a set of second computing devices among a plurality of second computing devices based on the received data indicative of resources of the first computing device, the identified set of second computing devices being identified by common attributes of resources of the plurality of second computing devices;
accessing historical data associated with the common attributes of the resources of the identified set of second computing devices, the accessed historical data being selected based at least in part on the common attributes of the resources of the identified set of second computing devices; and
calculating a probability of an event at the first computing device occurring based at least in part on the accessed historical data of the common attributes of the resources of the identified set of second computing devices.

2. The method of claim 1, further comprising: updating the probability of the event at the first computing device occurring based at least in part on updated historical data of the common attributes of the resources of the identified set of second computing devices.

3. The method of claim 2, wherein the probability comprises a probability distribution function and updating the probability comprises recalculating the probability using a current probability as an initial probability, and using the accessed updated historical data to adjust the initial probability, and wherein the method further comprises:
using the updated probability as the current probability for a subsequent update of the probability.

4. The method of claim 1, further comprising causing a maintenance action to be implemented at the first computing device, the maintenance action being selected based on the calculated probability of the event occurring.

5. The method of claim 1, further comprising:
based on a determination that the probability of the event is likely to occur, initiating a communication to the first computing device.

6. A system comprising:
at least one processor; and
at least one memory having stored therein instructions that, when executed by the at least one processor, cause the at least one processor to:
receive, from a first computing device, data indicative of resources of the first computing device, wherein the received data indicative of resources of the first computing device is collected without dependency on write permissions to a file system of the first computing device;
identify a set of second computing devices among a plurality of second computing devices based on the received data indicative of resources of the first computing device, the identified set of second computing devices being identified based on data indicative of resources of the plurality of second computing devices, wherein the data indicative of resources of the plurality of second computing devices is collected without dependency on write permissions to file systems of the plurality of second computing devices; and
predict a condition of the first computing device based at least in part on historical data associated with the resources of the identified set of second computing devices.

7. The system of claim 6, further comprising instructions that when executed by the at least one processor, cause the at least one processor to:
identify the set of second computing devices among the plurality of second computing devices based on common attributes of the resources of the plurality of second computing devices; and
update the predicted condition of the first computing device based at least in part on updated historical data associated with the common attributes of the resources of the identified set of second computing devices.

8. The system of claim 7, wherein the historical data is selected based at least in part on the common attributes of the identified set of second computing devices as determined by the received data indicative of resources of the first computing device, and wherein some of the common attributes are weighted more than the other common attributes based on a greater expected relevance to a probability of the predicted condition.

9. The system of claim 8, wherein the probability of the predicted condition comprises a probability distribution function.

10. The system of claim 6, wherein the historical data comprises crowdsourced data.

11. The system of claim 6, further comprising instructions that when executed by the at least one processor, cause the at least one processor to implement an application programming interface (API), wherein the API is configured to:
receive first electronic messages that encode identifiers indicative of a request for the predicted condition; and
in response to receiving the first electronic messages, send second electronic messages indicative of information pertaining to the request.

12. The system of claim 6, wherein the predicted condition comprises an impairment of the first computing device.

13. The system of claim 12, further comprising instructions that when executed by the at least one processor, cause the at least one processor to indicate a likely cause for the impairment.

14. The system of claim 6, further comprising instructions that when executed by the at least one processor, cause the at least one processor to initiate an action associated with the predicted condition.

15. The system of claim 6, further comprising instructions that when executed by the at least one processor, cause the at least one processor to send a recommended user action based on the predicted condition.

16. The system of claim 15, wherein the recommended user action comprises a change to a software or hardware configuration of the first computing device.

17. The system of claim 6, further comprising instructions that when executed by the at least one processor, cause the at least one processor to update the predicted condition based on a learning function.

18. A computing device comprising:
at least one processor; and
at least one memory having stored thereon instructions that, when executed by the at least one processor, cause the at least one processor to:
receive, from a first computing device, data indicative of resources of the first computing device without dependency on write permissions to file systems of the first computing device;
identify a set of second computing devices among a plurality of second computing devices based on the received data indicative of resources of the first computing device;
access historical data associated with resources of the identified set of second computing devices, the historical data being collected from the identified set of second computing devices without dependency on write permissions to file systems of the identified set of second computing devices; and
calculate a probability of an event occurring at the first computing device based at least in part on the accessed historical data of the resources of the identified set of second computing devices.

19. The computing device of claim 18, wherein the instructions, when executed by the at least one processor, cause the at least one processor to update the probability of the event as updated historical data becomes available.

20. The computing device of claim 18, wherein the instructions, when executed by the at least one processor, cause the at least one processor to identify the set of second computing devices among the plurality of second computing devices based on common attributes of resources of the plurality of second computing devices, and select the historical data to be accessed based at least in part on the common attributes of the resources of the identified set of second computing devices.

* * * * *